(12) United States Patent
Schmidt

(10) Patent No.: US 11,471,809 B2
(45) Date of Patent: Oct. 18, 2022

(54) FILTER DEVICE AND FIXING MEANS COMPRISING A FILTER DEVICE OF THIS TYPE

(71) Applicants: THYSSENKRUPP BILSTEIN GMBH, Ennepetal (DE); thyssenkrupp AG, Essen (DE)

(72) Inventor: Klaus Schmidt, Odenthal (DE)

(73) Assignees: THYSSENKRUPP BILSTEIN GMBH, Ennepetal (DE); THYSSENKRUPP AG, Essen (DE)

( * ) Notice: Subject to any disclaimer, the term of this patent is extended or adjusted under 35 U.S.C. 154(b) by 320 days.

(21) Appl. No.: 16/641,783

(22) PCT Filed: Aug. 7, 2018

(86) PCT No.: PCT/EP2018/071348
§ 371 (c)(1),
(2) Date: Feb. 25, 2020

(87) PCT Pub. No.: WO2019/042718
PCT Pub. Date: Mar. 7, 2019

(65) Prior Publication Data
US 2020/0353400 A1 Nov. 12, 2020

(30) Foreign Application Priority Data
Sep. 1, 2017 (DE) .................. 10 2017 120 172.6

(51) Int. Cl.
*B01D 46/00* (2022.01)
*B01D 46/10* (2006.01)
(Continued)

(52) U.S. Cl.
CPC ......... *B01D 46/10* (2013.01); *B01D 46/0005* (2013.01); *F16F 9/3285* (2013.01);
(Continued)

(58) Field of Classification Search
CPC .............................. B01D 46/10; F16F 9/3285
See application file for complete search history.

(56) References Cited

U.S. PATENT DOCUMENTS

| 1,659,038 A | 2/1928 | Mallory |
| 4,526,213 A | 7/1985 | Martinez |

(Continued)

FOREIGN PATENT DOCUMENTS

| CN | 2 600 151 Y | 1/2004 |
| CN | 1469067 A | 1/2004 |

(Continued)

OTHER PUBLICATIONS

English Translation of International Search Report issued in PCT/EP2018/071348, dated Nov. 13, 2018.

*Primary Examiner* — Robert A Hopkins
(74) *Attorney, Agent, or Firm* — thyssenkrupp North America, LLC

(57) ABSTRACT

A filter for use at an airflow opening of bellows of a shock absorber. The filter device includes a filter body through which a gas, in particular air, can flow in in the direction of an air inflow direction and out in the direction of an air outflow direction. The airflow opening is a joint air inlet and air outlet opening. A fastening means is disclosed that is fitted with a filter, in particular a fastening ring fitted therewith, for fastening bellows to a shock absorber.

20 Claims, 4 Drawing Sheets

(51) Int. Cl.
   *F16F 9/32*   (2006.01)
   *F16F 9/04*   (2006.01)

(52) U.S. Cl.
   CPC ...... *B01D 46/0087* (2013.01); *B01D 2273/14* (2013.01); *B01D 2275/203* (2013.01); *F16F 9/0454* (2013.01)

(56) References Cited

U.S. PATENT DOCUMENTS

| | | | |
|---|---|---|---|
| 4,529,213 A | 7/1985 | Goodman | |
| 4,722,450 A | 2/1988 | Cotelle | |
| 5,472,072 A | 12/1995 | Bumgarner | |
| 7,370,571 B2 * | 5/2008 | Tsubouchi | B60T 13/57 91/369.2 |
| 2016/0279546 A1 | 9/2016 | Capuani | |

FOREIGN PATENT DOCUMENTS

| | | | | |
|---|---|---|---|---|
| CN | 201618498 U | | 11/2010 | |
| CN | 203777688 U | | 8/2014 | |
| CN | 104948789 A | | 9/2015 | |
| CN | 105317516 A | | 2/2016 | |
| CN | 209510994 U | * | 10/2019 | ............. F16F 13/00 |
| DE | 70 47 641 U | | 5/1972 | |
| DE | 21 25 117 A | | 12/1972 | |
| DE | 199 17 998 C | | 11/2000 | |
| DE | 19917998 A1 | | 11/2000 | |
| DE | 102 00 608 A | | 8/2002 | |
| DE | 10200608 A1 | * | 8/2002 | ........... B60G 15/063 |
| DE | 10 2004 042 552 B | | 6/2007 | |
| EP | 1 607 250 A | | 12/2005 | |
| EP | 2 960 450 A | | 12/2015 | |
| GB | 1 384 012 A | | 2/1974 | |
| JP | H 10-47481 A | | 2/1998 | |
| WO | 97/07999 A | | 3/1997 | |

* cited by examiner

FILTER DEVICE AND FIXING MEANS COMPRISING A FILTER DEVICE OF THIS TYPE

CROSS REFERENCE TO RELATED APPLICATIONS

This application is a U.S. National Stage Entry of International Patent Application Serial Number PCT/EP2018/071348, filed Aug. 7, 2018, which claims priority to German Patent Application No. DE 10 2017 120 172.6, filed Sep. 1, 2017, the entire contents of both of which are incorporated herein by reference.

FIELD

The present disclosure generally relates to a filter device for use at an airflow opening of bellows of a shock absorber.

BACKGROUND

Shock absorbers are particularly used in the motor vehicle sector and are fitted between a wheel suspension and a vehicle body in order to dampen vibrations in a chassis and/or one or more wheels, so that both vehicle safety and also traveling comfort for a vehicle user are thereby improved. During the operation of shock absorbers, a functional distinction is made between rebound, in which a wheel or the chassis moves downwards, and compression, in which the wheel or chassis moves upwards. During rebound, a piston rod is moved out of a cylinder of the shock absorber in this case, while the piston rod is inserted back into the shock absorber during compression.

In order to protect the piston rod which moves in and out of the cylinder during operation, or else while a motor vehicle is being driven, it is known in the art for the shock absorber to be surrounded at least sectionally by bellows which follow the oscillating movement of the piston rod with an up-and-down movement, so that the piston rod is protected at least rudimentarily from environmental contamination.

Since the volume of the bellows changes during each of the up-and-down movements of the piston rod, airflow openings are provided at the bellows or in the region of the fastening of the bellows to the shock absorber, through which openings ambient air can flow into the bellows during the rebound, said air then being pressed out of the bellows again during compression to avoid excess pressure in the bellows.

A problem with a design of this kind is that during the inflow of air into the bellows, dirt particles can also get into the bellows with this air and then also be deposited in an unwanted manner on the piston rod, which causes wear of the piston rod.

This problem has hitherto been solved, albeit inadequately, by the airflow openings being configured in the manner of a labyrinth seal, so that any dirt particles could be deposited in the windings of the labyrinth and no longer penetrate as far as the main volume of the bellows. Labyrinth seals of this kind are technically complex to produce, however, and therefore expensive and, moreover, are only effective for coarser dirt particles in relation to their filtering action, while smaller dirt particles cannot be effectively retained. Furthermore, another disadvantage of labyrinth seals of this kind is that any excess pressure which may occur in the bellows cannot be released quickly enough, meaning that there is a risk of damage to the bellows and possibly even to the shock absorber.

In order to solve this problem, DE 102 00 608 A1 describes a use of a filter instead of a labyrinth seal, wherein the filter is connected to the air inlet of the bellows via a flexible hose or, however, alternatively is arranged at a separate air inlet of the bellows located there. A substantial disadvantage of the solution proposed in DE 102 00 608 A1 for keeping the main volume of the bellows clean is, however, that two separate airflow openings are necessary there for pressure equalization in the bellows during the up-and-down movement of the piston rod, namely an airflow direction fitted with, or connected to, the filter element and also a further separate air outflow direction required for the pressure relief of the bellows.

Thus a need exists for a filter device, and also a fastening means fitted with a filter device, wherein the filter device can be produced easily and cost-effectively and contamination of the main volume of a bellows and also of a piston rod moving in the bellows is prevented and at the same time, particularly where there is rapidly increasing pressure in the bellows, the most unimpeded air exchange possible with the environment is facilitated.

DETAILED DESCRIPTION

Figure 1:
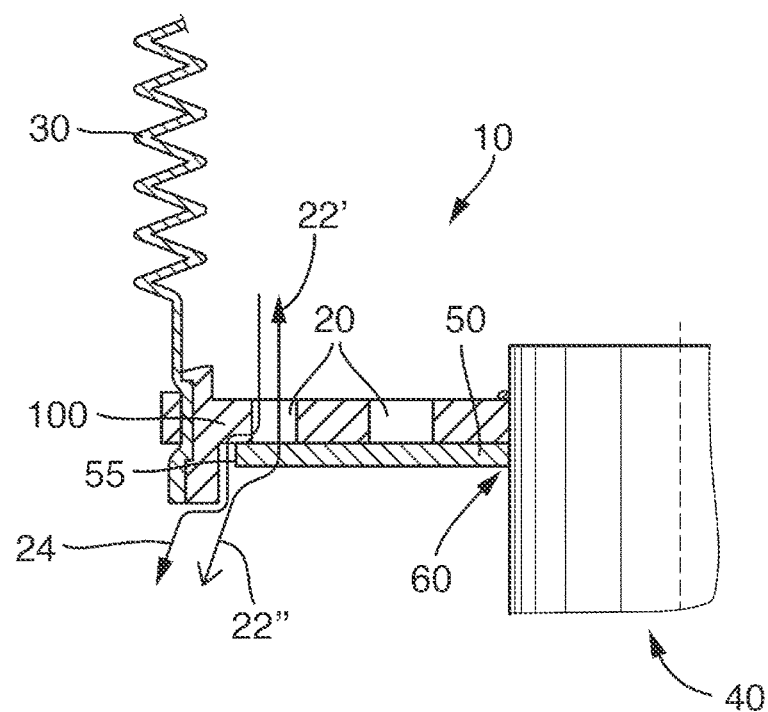
FIG. 1 is a schematic side view of a first embodiment of a filter device with the filter body closed.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The invention relates to a filter device for use at an airflow opening of bellows of a shock absorber and also to a fastening means for fastening bellows to a shock absorber.

In particular, the problem is solved by a filter device which is devised and provided for use at an airflow opening of a bellows of a shock absorber, wherein the filter device comprises a filter body through which a gas, in particular air, can flow in in the direction of an air inflow direction and out in the direction of an air outflow direction, and wherein the airflow opening is a joint air inlet and air outlet opening.

A substantial point of the invention is that the filter device according to the invention is devised in such a manner that air can not only flow into the volume of the bellows, but can also flow out of the volume of the bellows through said filter device, or through said filter body; the air consequently flows both in the air inflow direction and in the air outflow direction likewise through the filter body and is thereby cleaned and freed of particles. The use of a filter body of this kind which allows a bidirectional airflow advantageously enables, according to the invention, bellows and/or a fastening means for fastening the bellows to be used on a shock absorber which only has a joint airflow opening for an air inlet and for an air outlet into, and out of, the volume of the bellows.

Furthermore, the filter body is held or mounted according to the invention in a filter mount, wherein the mount encloses the filter body either substantially completely or the filter body is held, articulated and/or fixed at only one side of the filter body or at a side region of the filter body.

According to a preferred embodiment of the invention, the filter device has an excess pressure relief device, where necessary with a non-return function. This excess pressure relief mechanism, which is used according to the invention when there is a sudden excessive increase in pressure in the main volume of the bellows, may be a separate excess pressure valve according to the invention, but according to a particularly preferred embodiment of the invention it is formed by the filter body itself, wherein the filter body in this case is arranged on and/or in an air outflow opening of the bellows and/or of the fastening means for the bellows in such a manner that when an excess pressure occurs in the main volume of the bellows, the filter body releases the air outflow opening at least partially, but at least far enough for the pressure generated in the main volume of the bellows to be reduced. To this end, the filter body according to the invention folds out outwardly, i.e. in the direction of the ambient air, and clears the air outflow opening.

According to the invention, the filter body is produced for this purpose from a flexible, preferably mat-like material exhibiting a restoring force and/or held in a movable filter body frame which is air-permeable in the air inflow and air outflow direction, which filter body frame can be exposed to a restoring force. According to the first variant, the filter body can be fastened at one side to a channel forming the air outflow opening or to an opening forming the air outflow opening, while the remaining portion of the filter body is freely movable substantially at least, but preferably only, in the direction of the ambient air and in the inoperative position is substantially only held in a position closing the air outflow opening by its intrinsic restoring force, in which closing position it is always located when air flows through the air inflow opening, which is identical to the air outflow opening, into an internal volume of the bellows.

The filter body is further also located in this inoperative position when air flows from the internal volume of the bellows, provided a predefined air outflow pressure is not exceeded. Consequently, both the air flowing into the internal volume of the bellows and the air flowing out of the internal volume of the bellows is always conducted through the filter body during normal operation, i.e. whenever the predefined air outflow pressure is not exceeded. Only in the event that excess pressure should occur is the flexible filter body forced by the air outflow pressure, which is excessive according to the previous definition, from its resting position or inoperative position.

According to a further embodiment of the invention, the filter body, as previously mentioned, may also be arranged in a filter body frame which is air-permeable in the air inflow and air outflow direction. In this case, it is not the filter body itself which is held in a position closing the air outflow opening, but the filter body frame which contains the filter body. In this case, the filter body frame seals the airflow opening in a similar manner to the filter body itself according to the above embodiment if the filter body is used without the filter body frame. Otherwise, the method of operation of the filter device according to the invention with filter body frame substantially corresponds to the method of operation of the filter device according to the invention when the filter body is not held in a frame, but creates said frame, so to speak. Furthermore, it should be mentioned that the filter body, if it is used in a filter body frame, need not necessarily be flexible.

According to the invention, both the filter body and the filter body frame can be moved by a restoring force, which is preferably adjustable, into an inoperative position in which the filter body closes the at least one joint air inlet and air outlet opening in the air inflow direction and also in the air outflow direction in a filtering manner up to a predefined air outflow pressure.

If excess pressure occurs, the filter body or the filter body frame is moved, more particularly forced, against the restoring force from the inoperative position into a working position during an outflow of air at high pressure, i.e. at a pressure higher than the predefined air outflow pressure, in the air outflow direction.

According to a further embodiment of the invention, an opening degree of the working position of the filter body or the filter body frame can be limited by a stop. In this way, depending on the design, an "overfolding" of the filter body or the filter body frame can be avoided and trouble-free operation of the filter device according to the invention can be guaranteed.

According to a further preferred embodiment of the invention, the filter body may be arranged in a stationary, or a stationary-fastenable, filter body frame element. In this case, a bypass surrounding the filter body is provided according to the invention as an excess pressure relief mechanism which preferably comprises a non-return valve, more particularly a non-return flap, which closes the bypass, provided an internal volume pressure in the bellows lies below the predefined air outflow pressure. Only when the pressure occurring in the internal volume of the bellows exceeds the predefined air outflow pressure does the non-return valve, or the non-return flap, open up the bypass for pressure relief and automatically open an additional pressure relief opening acting as an air outflow opening. As soon as the pressure occurring in the internal volume of the bellows drops below the level of the predefined air outflow pressure, it automatically closes the non-return flap closing the bypass, so that air flowing into the internal volume of the bellows and from the internal volume of the bellows always has to flow through the filter body arranged in the fixed filter body frame element.

According to the invention, the filter body is in any event configured as a particle filter, although it may also in addition be configured as a harmful substance filter, particularly in relation to substances with corrosive action. Furthermore, multiple filter bodies may also be used additively according to the invention, wherein the different filter bodies can then be configured for the filtration of different substances. Hence, for example, one filter body may act as a particle filter, while another filter body prevents aggressive gases from entering the internal volume of the bellows. This is particularly advantageous when the bellows are used in environments which are heavily loaded with contaminants and dust. The individual filter bodies can then be replaced jointly, or also separately, as required.

According to a further preferred embodiment of the invention, the filter body has a self-cleaning design, particularly in respect of particle impurity/impurities, more particularly it can be tapped and/or brushed off and/or blown out. The self-cleaning action of the filter body in this case preferably results from the fact that the filter body has air flowing through it not only in one direction, but both in the air inflow direction and also in the air outflow direction. The respective airflow, i.e. more particularly the respective air outflowing from the volume of the bellows, in this case conveys particles deposited on and/or possibly superficially in the filter body back in the direction of the ambient air, where they can fall from the filter body or be blown away from it by the airflow. Furthermore, particle impurities according to the invention, particularly when using a flexible filter body or a filter body arranged in a movable filter body frame, can also be tapped and/or brushed off the filter body in a particularly advantageous way, namely, for example, when a flexible filter body is deformed and therefore helps with a mechanical cleaning of itself and/or when the flexible filter body or the movable filter body frame folds back into its inoperative position and in this case experiences a vibration when striking the air outflow opening. The same also applies if the movable filter frame body or the flexible filter body strikes against a stop which may be provided and which, in the case of an excess pressure occurring in the volume of the bellows, delimits the opening width of the flexible filter body or the movable filter body frame.

Consequently, the self-cleaning of the filter body according to the invention takes place through a particularly functional deformation of the filter body and/or through tapping and/or blowing off if the filter body (50) or the filter body frame moves from the inoperative position into the working position and back or strikes a stop delimiting an opening angle.

In addition, according to the invention a separate filter body may be provided for each airflow opening and/or a joint filter body for one or multiple airflow openings. In the case of a joint flexible filter body for multiple airflow openings or a filter body provided in a filter body frame, said filter body extends over all provided airflow openings and opens up said openings at least partially when excess pressure occurs in the interior volume of the bellows.

Furthermore, the problem according to the invention is also solved by a fastening means, more particularly by a fastening ring, which is used for fastening bellows to a shock absorber. The fastening ring according to the invention is provided with at least one filter device according to the previous comments and during operation is placed about a cylinder of the shock absorber and fastened thereto. The air flowing into and out of the bellows then flows through the filter device according to the invention arranged in the fastening ring, wherein said fastening ring can act as a mount for the filter device, for example, and/or the filter body, or else a filter body frame holding the filter body.

Figure 2:
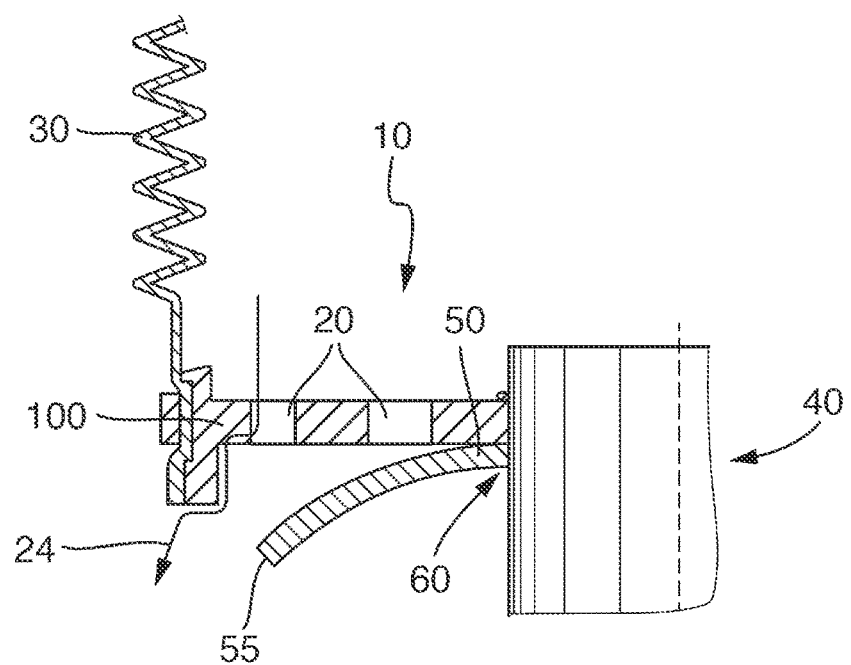
FIG. 2 is a schematic side view of a first embodiment of a filter device with a filter body opened by excess pressure.

FIG. 1 shows a schematic representation of a first embodiment of a filter device 10 according to the invention with the filter body 50 closed as a sectional view. The filter body 50, as emerges from FIG. 1 in conjunction with FIG. 2, is shown on the right side in the representations, fastened to a shock absorber 40, more precisely to a cylinder of a shock absorber 40 on a filter mount 60. In the inoperative position, the filter body 50 lies against the joint air inlet and air outlet openings 20 of the filter device 10 according to the invention. The air flowing into the interior of a bellows 30 flows along an air inflow direction 22' through the filter body 50 and the air inflow opening 20. In the opposite direction, the air flowing out of the interior of the bellows 30 flows along an air outflow direction 22" through the filter body 50 and the air outflow opening 20, which is the same as the air inflow opening 20. It can be seen from both FIG. 1 and also from FIG. 2 that the filter device 10 according to the invention is arranged integrated in a fastening ring 100 and is attached to the shock absorber 40. If excess pressure occurs in the interior of the bellows 30, the filter body 50, which is configured as a flexible filter body 50, folds downwards with its free filter body end portion 55, i.e. in the direction of the ambient air, and clears the air outlet opening 20, so that an excess pressure developing in the interior volume of the bellows 30 can be reduced along an excess pressure path 24 outwardly in the direction of the ambient air.

Figure 3:
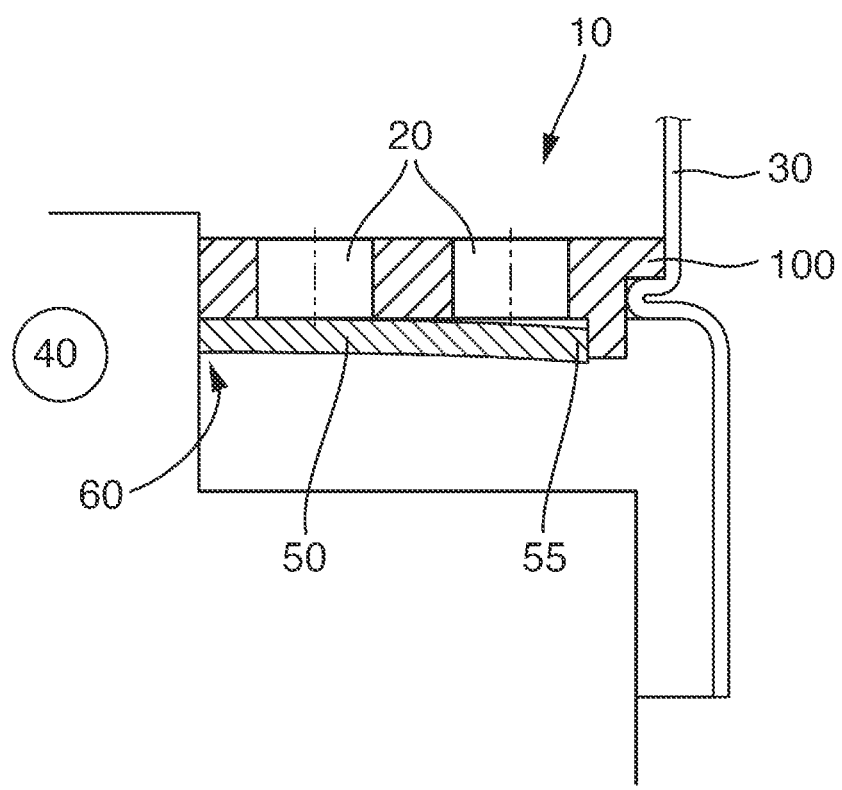
FIG. 3 is a further schematic side view of an inventive filter device.

FIG. 3 shows a similar embodiment of a filter device 10 according to the invention, as shown in FIG. 1 and FIG. 2; however, the fastening ring 100 is attached to the shock absorber 40 using an alternative fastening. The method of operation of the filter device 10 shown in FIG. 3 corresponds, however, to that also depicted in FIG. 1 and FIG. 2.

Figure 4:
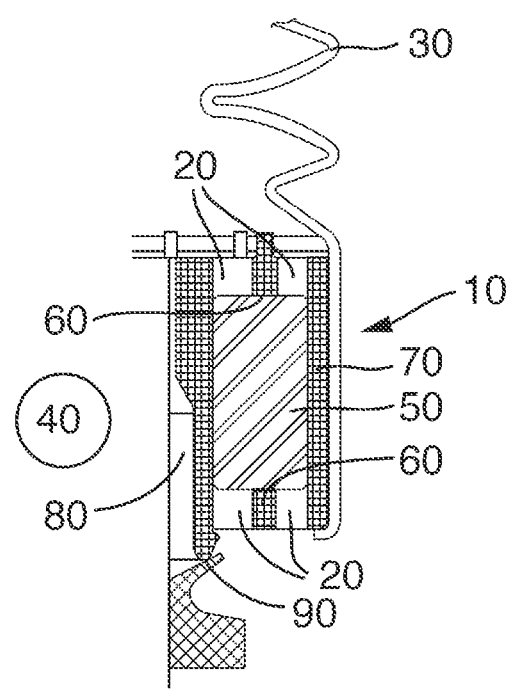
FIG. 4 is a schematic side view of a further embodiment of a filter device with a fixed filter body.

FIG. 4 shows a schematic representation of a further embodiment of a filter device according to the invention with a fixed filter body in side view. According to this embodiment of the invention, the filter body 50 is arranged in a filter body frame element 70 and fixed in a stationary manner by filter mounts 60. The filter body 50 according to this embodiment is arranged in an immobile, i.e. stationary and immovable, manner. As is also the case with the embodiments described above, here too the air flowing into an internal volume of the bellows 30 through the filter body 50 and also through the filter body frame element 70 and the air inflow opening 20 and also in the reverse direction during an outflow from the internal volume of the bellows 30 in the opposite direction through the air outflow opening 20 flows back into the ambient air. Unlike the embodiments shown in FIG. 1 to FIG. 3 of a filter device 10 according to the invention, the filter body 50 according to the embodiment depicted in FIG. 4 cannot open up the air outflow opening 20 when excess pressure occurs in the internal volume of the bellows, since the filter body 50 is fixed in the filter body frame element 70. For this reason, a bypass 80 is provided along the side of the filter body frame element 70, through which air can flow out from the interior of the bellows when a predefined air outflow pressure is exceeded. The bypass 80 is closed in the inoperative position by a non-return flap 90 which automatically opens when the predefined air outflow pressure is exceeded and also closes again automatically due to preloading if the pressure in the internal volume of the bellows 30 falls below the predefined air outflow pressure once again. In this case, during a pressure increase in the internal volume of the bellows 30, the air flows normally through the air outlet opening 20 and the filter body frame element 70 and also the filter body 50.

Figure 5:
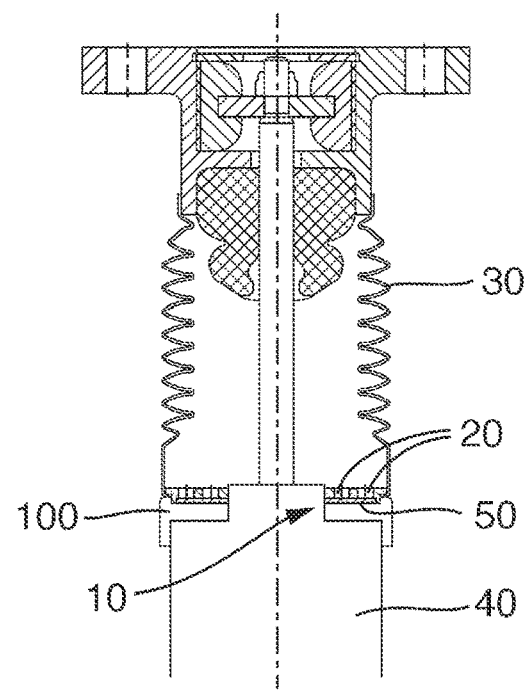
FIG. 5 is a schematic side view of a unit made up of a shock absorber, bellows and inventive filter device in accordance with the device of FIG. 3.
Figure 6:
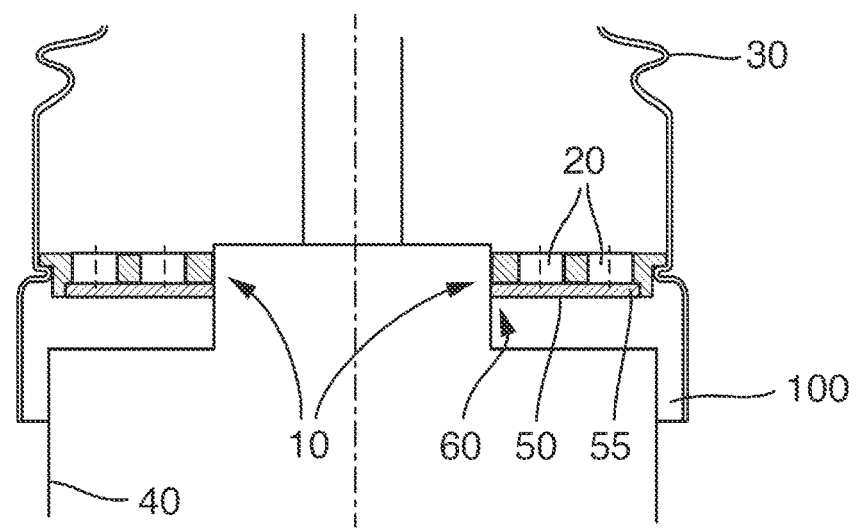
FIG. 6 is a detail view of the device of FIG. 5.

FIG. 5 shows a schematic representation of a unit made up of a shock absorber, bellows and inventive filter device according to the embodiment of the invention shown in FIG. 3 in side view. As can be seen in FIG. 5, the filter device according to the invention is integrated in a fastening ring 100 which fixes the lower end of a bellows to the cylinder of a shock absorber 40. A detail view of the representation shown in FIG. 5 is shown in FIG. 6.

Figure 7:
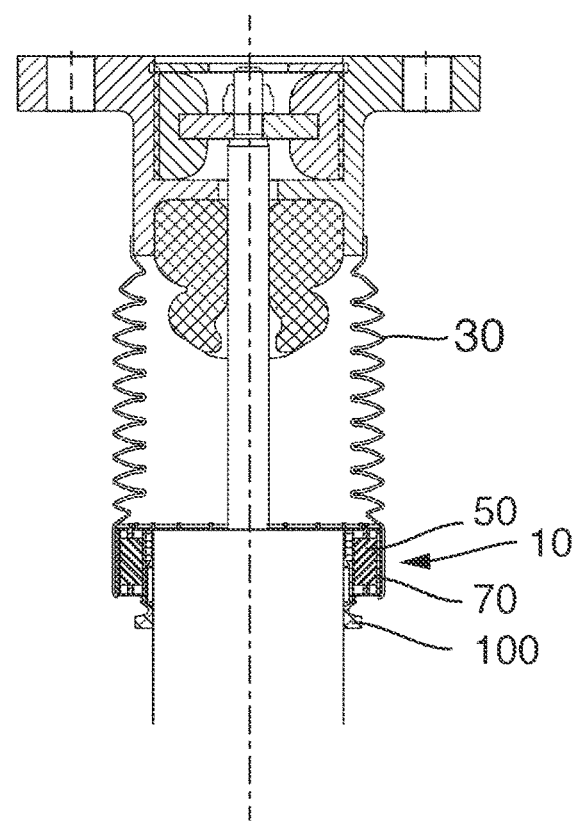
FIG. 7 is a schematic side view of a unit made up of a shock absorber, bellows and inventive filter device according to the device of FIG. 4.
Figure 8:
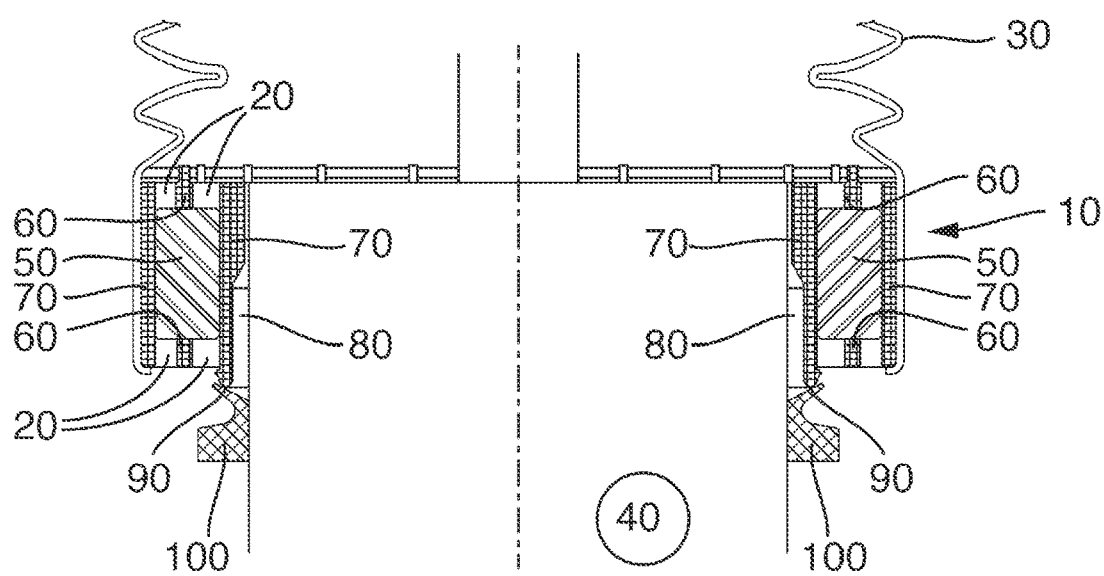
FIG. 8 is a detail view of the device of FIG. 7.

FIG. 7 shows a schematic representation of a unit made up of a shock absorber, bellows and inventive filter device according to the embodiment of the invention shown in FIG. 4 in side view. As can be seen in FIG. 7, the filter device according to the invention is integrated in a fastening ring 100 which fixes the lower end of a bellows to the cylinder of a shock absorber 40. A detail view of the representation shown in FIG. 7 is shown in FIG. 8.

At this point it should be pointed out that all the parts described above, both individually and in any combination, particularly the details depicted in the drawings, are claimed as essential to the invention. Modifications to these will be jointly known by the person skilled in the art.

LIST OF REFERENCE NUMBERS

10 Filter device
20 Air inlet and air outlet opening
22' Air inflow direction
22" Air outflow direction
24 Excess pressure path
30 Bellows
40 Shock absorber
50 Filter body
55 Filter body end portion
60 Filter mount
70 Filter body frame element
80 Bypass
90 Non-return flap
100 Fastening ring

What is claimed is:

1. A filter device for use at an airflow opening of bellows of a shock absorber, the filter comprising:
a filter body configured to fit to an airflow opening of a bellows and configured to permit a gas to enter in the direction of an air inflow direction and exit in the direction of an air outflow direction, wherein the airflow opening is a joint air inlet and air outlet opening; and
a movable filter body frame that holds the filter body and is movable relative to the shock absorber, the movable filter body frame being air-permeable in the air inflow and air outflow direction, wherein the movable filter body frame is configured to be exposed to a restoring force.

2. The filter device of claim 1 wherein the filter body is produced from a flexible, mat-like material exhibiting a restoring force.

3. The filter device of claim 2 wherein the filter body or the filter body frame can be moved by the restoring force into an inoperative position in which the filter body closes the at least one joint air inlet and air outlet opening in the air inflow direction and also in the air outflow direction in a filtering manner up to a predefined air outflow pressure.

4. The filter device of claim 2 wherein the filter body or the filter body frame is moved against the restoring force from the inoperative position into a working position during an outflow of air at a pressure higher than the predefined air outflow pressure, in the air outflow direction.

5. The filter device of claim 4 wherein an opening degree of the working position of the filter body or the filter body frame is limited by a stop.

6. The filter device of claim 1 wherein a bypass surrounding the filter body is provided as an excess pressure relief mechanism which comprises a pressure relief closure in the form of a non-return valve which closes the bypass and automatically opens it for pressure relief from a predefined air outflow pressure.

7. The filter device of claim 1 wherein the filter body is configured as a particle filter and/or as a harmful substance filter.

8. The filter device of claim 1 wherein the airflow opening comprises a plurality of airflow openings, wherein the filter body comprises a separate filter body for each airflow opening.

9. A fastening ring, comprising the filter device of claim 1, the fastening ring configured to fasten bellows to a shock absorber.

10. The filter device of claim 1 wherein the airflow opening comprises a plurality of airflow openings, the filter device comprising a single joint filter body for the plurality of airflow openings.

11. The filter device of claim 1 wherein the filter body is fixed at only one side of the filter body.

12. The filter device of claim 1 wherein a side of the filter body is fastened to a channel forming the airflow opening, wherein a remaining portion of the filter body is freely movable.

13. The filter device of claim 1 wherein the movable filter body frame seals the airflow opening.

14. The filter device of claim 1 wherein both the filter body and the filter body frame are configured to be exposed to the restoring force, wherein the restoring force is adjustable.

15. The filter device of claim 1 wherein the movable filter body frame is foldable.

16. The filter device of claim 15 wherein the movable filter body frame is configured to vibrate when the filter body frame folds back and strikes the outflow opening or a stop.

17. A filter device for use at an airflow opening of bellows of a shock absorber, the filter device comprising:
a filter body configured to fit to an airflow opening of a bellows and configured to permit a gas to enter in the direction of an air inflow direction and exit in the direction of an air outflow direction; and
an excess pressure relief mechanism,
wherein the airflow opening is a joint air inlet and air outlet opening.

18. The filter device of claim 17 wherein the pressure relief mechanism includes a non-return function.

19. A filter device for use at an airflow opening of bellows of a shock absorber, the filter device comprising:
a filter body that is configured to fit to an airflow opening of a bellows, configured to permit a gas to enter in the direction of an air inflow direction and exit in the direction of an air outflow direction, and configured to be self-cleaning,
wherein the airflow opening is a joint air inlet and air outlet opening.

20. The filter device of claim 19 wherein the self-cleaning of the filter body takes place through a deformation of the filter body and/or through tapping and/or blowing off when the filter body or the filter body frame moves from an inoperative position into a working position and back or strikes a stop delimiting an opening angle.

* * * * *